(12) United States Patent
Rozin et al.

(10) Patent No.: US 10,169,040 B2
(45) Date of Patent: Jan. 1, 2019

(54) SYSTEM AND METHOD FOR SAMPLE RATE CONVERSION

(71) Applicant: Ceva D.S.P. Ltd., Herzlia Pituach (IL)

(72) Inventors: Hagay Rozin, Raanana (IL); Jeffery Allan (Alon) Jacob (Yaakov), Raanana (IL)

(73) Assignee: Ceva D.S.P. Ltd., Herzlia Pituach (IL)

( * ) Notice: Subject to any disclaimer, the term of this patent is extended or adjusted under 35 U.S.C. 154(b) by 136 days.

(21) Appl. No.: 15/352,598

(22) Filed: Nov. 16, 2016

(65) Prior Publication Data

US 2018/0136935 A1    May 17, 2018

(51) Int. Cl.
*G06F 9/30*    (2018.01)
*G06F 17/10*    (2006.01)

(52) U.S. Cl.
CPC ........ *G06F 9/30032* (2013.01); *G06F 9/3001* (2013.01); *G06F 9/30036* (2013.01); *G06F 9/30116* (2013.01); *G06F 9/30134* (2013.01); *G06F 17/10* (2013.01)

(58) Field of Classification Search
CPC .......................... G06F 9/30032; G06F 9/30036
See application file for complete search history.

(56) References Cited

U.S. PATENT DOCUMENTS

| 3,939,330 A | 2/1976 | Fluet |
| 5,862,063 A | 1/1999 | Thome et al. |
| 7,085,795 B2 * | 8/2006 | Debes ................. G06F 9/30014 708/319 |
| 7,219,214 B2 * | 5/2007 | Ford ................... G06F 9/30032 711/154 |
| 8,624,760 B2 | 1/2014 | Ngo et al. |
| 9,477,472 B2 * | 10/2016 | Macy, Jr. ................. G06F 7/76 |
| 2010/0100389 A1 | 4/2010 | Stoner |

\* cited by examiner

*Primary Examiner* — Benjamin P Geib
(74) *Attorney, Agent, or Firm* — Pearl Cohen Zedek Latzer Baratz LLP

(57) ABSTRACT

A system and method for performing sample rate conversion by an execution unit, including receiving an instruction, where the instruction comprises an irregular shifting pattern of data elements stored in a vector register, and shifting the data elements in the vector register according to the irregular shifting pattern. In case of upsampling the irregular shifting pattern includes an indication stating whether a memory element loads a data element from an immediate next memory element or from a second next memory element. In case of downsampling the irregular shifting pattern includes an indication stating whether a memory element in the input vector register loads a data element from an immediate next memory element, or whether the memory element loads a data element previously stored in a shadow vector register and the data element stored in the immediate next memory element is loaded into the shadow vector register.

10 Claims, 5 Drawing Sheets

SYSTEM AND METHOD FOR SAMPLE RATE CONVERSION

FIELD OF THE INVENTION

The present invention relates generally to the field of sample rate conversion, and more particularly, to shifting of input samples in a vector register for performing sample rate conversion.

BACKGROUND

Sample rate conversion refers to changing a sampling rate of a discrete signal. When the sapling rate is increased, the process may also be referred to as upsampling, which involves interpolation of sample points of the original sampled signal. When the sapling rate is decreased the process may also be referred to as downsampling, which reduces the sample rate of the signal. Upsampling typically includes low pass filtering after increasing the data rate to smooth the signal, and downsampling typically includes low pass filtering before decreasing the data rate, to avoid aliasing distortion. Applications of sample rate conversion include, inter alia, image scaling and rate conversion of audio signals.

In a digital signal processors (DSP) with a register-based architecture, data is loaded into registers, computations are performed on the content of the registers, and results are transferred from the registers back to memory. When performing a computation, the execution unit will use several registers for storing source operands and write the results to a destination register. In a vector register these same rules hold true, except that the contents of the registers are partitioned into multiple elements or memory elements (based on the vector width), whereby each element may be manipulated independently of other elements.

Typically, implementing a sample rate converter in a DSP requires permuting and organizing the data. This is due to the fact that the sample rate converter performs rate conversion and therefore does not necessarily shift each data element by one for each sequential output sample. For example, when upsampling with a vector processor, the input data would need to be permuted in such a way to repeat the same input data according to a pattern.

Permutation of data elements for sample rate conversion requires dedicated hardware resources, including multiplexers and complex wiring for moving data elements between memory elements. Typically, permuting requires an additional pipeline stage, adding to the hardware complexity. Further, the permutation has to be reconfigured, for example by software, for each output sample. This consumes DSP resources, including memory operations and/or vector registers, which may increase programming effort and may also require extra DSP cycles, slowing the rate of the conversion and degrading the DSP performance.

SUMMARY OF THE INVENTION

According to embodiments of the present invention, there is provided a method for performing sample rate conversion by an execution unit. The method may include for example receiving an instruction, wherein the instruction comprises an irregular shifting pattern of data elements stored in a vector register; and shifting the data elements in the vector register according to the irregular shifting pattern.

Furthermore, according to embodiments of the present invention, the method may include multiplying each data element stored in the vector register by a corresponding filter coefficient; adding each result of the multiplication to a corresponding previous value stored in an output register; and storing the results of the addition in the output register.

Furthermore, according to embodiments of the present invention, the sample rate conversion may include upsampling, and the irregular shifting pattern may be provided by an indication stating whether a memory element should load a data element from an immediate next memory element or from a second next memory element.

Furthermore, according to embodiments of the present invention, the instruction may include a string of elements, each having one of a first value and a second value, and each corresponding to a memory element in the vector register, and the first value may indicate that a corresponding memory element should load a data element from an immediate next memory element, and the second value may indicate that a memory element should load a data element from a second next memory element.

Furthermore, according to embodiments of the present invention, the sample rate conversion may include downsampling, and the irregular shifting pattern may be provided by an indication stating whether a memory element in the input vector register should load a data element from an immediate next memory element, or whether the memory element should load a data element previously stored in a shadow vector register and the data element stored in the memory element is loaded into the shadow vector register.

Furthermore, according to embodiments of the present invention, the instruction may include a string of elements, each having one of a first value and a second value, and each corresponding to a memory element of the input register, where the first value may indicate that a corresponding memory element in the input vector register should load a data element from an immediate next memory element and the second value may indicate that a corresponding memory element should load a data element previously stored in a shadow vector register and a data element stored in the corresponding memory element may be loaded into the shadow vector register.

According to embodiments of the present invention, there is provided a processor for performing sample rate conversion. The processor may include for example a vector register comprising a plurality of memory elements for storing data elements; and a execution unit configured to: receive an instruction, wherein the instruction may include an irregular shifting pattern for the data elements stored in the vector register; and shifting the data elements in the vector register according to the irregular shifting pattern.

Furthermore, the processor may include an output register, wherein the execution unit may be further configured to: multiply each data element stored in the vector register by a corresponding filter coefficient; add each result of the multiplication to a corresponding previous value stored in the output register; and store the results of the addition in the output register.

Furthermore, the processor may include a shadow register, where the sample rate conversion may include downsampling, and wherein the irregular shifting pattern may be provided by an indication stating whether a memory element in the input vector register should load a data element from an immediate next memory element, or whether the memory element should load a data element previously stored in the shadow vector register and the data element stored in the memory element is loaded into the shadow vector register.

Furthermore, the processor may include a shadow register, where the instruction may include a string of elements, each having one of a first value and a second value, and each corresponding to a memory element of the input register, wherein the first value indicates that a corresponding memory element in the input vector register should load a data element from an immediate next memory element and the second value indicates that a corresponding memory element should load a data element previously stored in the shadow vector register and a data element stored in the corresponding memory element is loaded into the shadow vector register.

Furthermore, the processor may include a plurality of selection mechanisms, each connected to one of the memory elements and configured to select one of the following inputs: load input, next element input, second next element input, and shadow register input.

According to embodiments of the present invention, there is provided a method for performing sample rate conversion by a processor. The method may include receiving an indication of an irregular shifting scheme of the data elements stored in the vector register; and shifting the data elements in the vector register according to the irregular shifting scheme.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
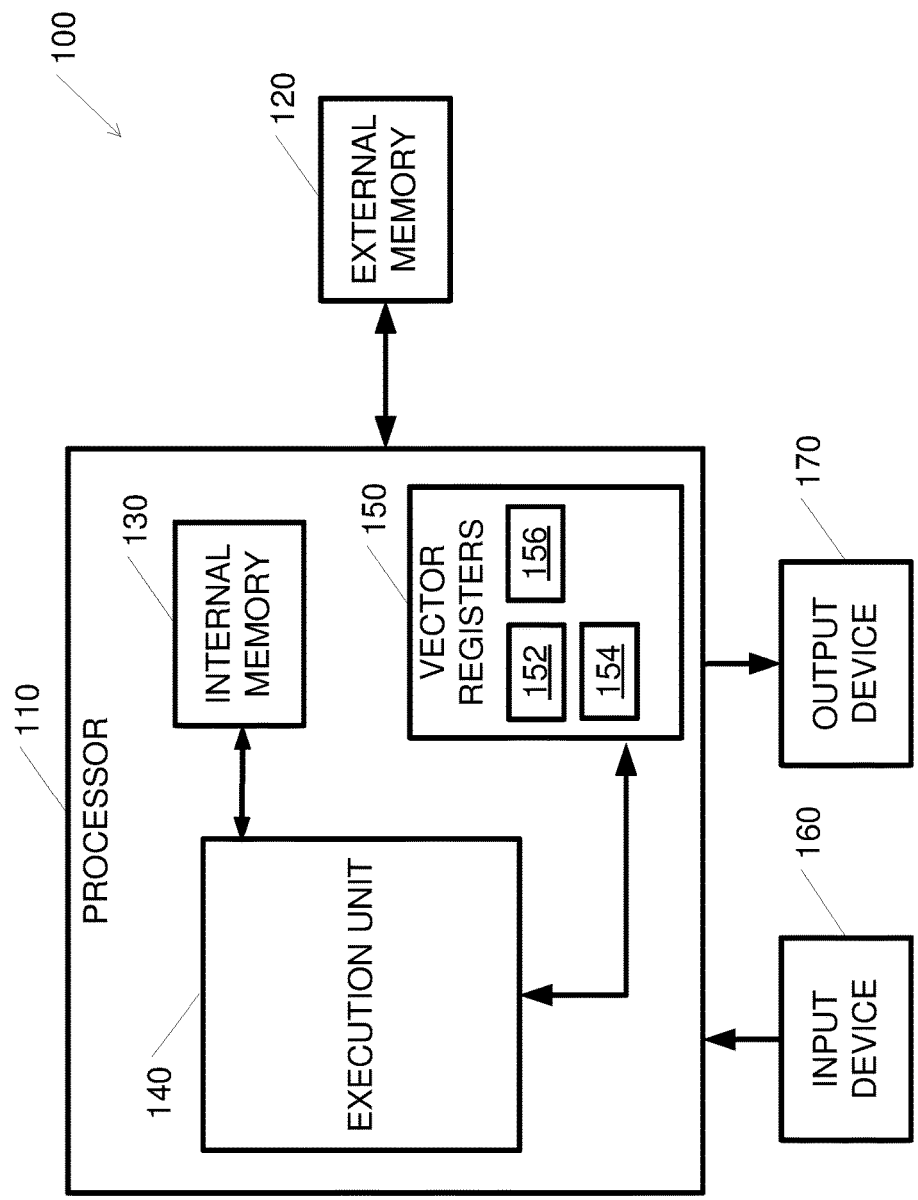
FIG. 1A is schematic illustration of an exemplary device according to embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

In an upsampling filter, the same data elements or data samples may be utilized as filter inputs for consecutive output samples, such that there is a pattern, determined by the upsampling rate, whereby input data is either shifted by one element between consecutive output samples, like in a normal integer filter, or not shifted between consecutive output samples. In other words, for calculating some output samples there is a shift of input data and for calculating other output samples there is no shift of input data. Thus, the input data samples are shifted according to an irregular shifting pattern that repeats according to the upsampling rate. Additionally, a plurality of coefficient sets is used. For example, a rate of 1.5× means that for every 2 input samples the filter produces 3 output samples, and hence the input data shifts at a rate of 1/1.5=0.67 samples per output. Embodiments of the present invention relate to handling of the shifting pattern of input samples.

The following provides an example for an upsampling filter having an upsampling rate of 1.5×. In the following example, and throughout the application, N is the filter length, the notation $x_0, x_1, x_2, \ldots x_{N-1}$ indicates input data or input samples, $y_0, y_1, y_2, \ldots$ indicates output data, and 'f' represents the filter function. Upsampling filtering may be performed according to for example the following equations:

$$y_0 = f(x_0, x_1, x_2, \ldots, x_{N-1})$$

$$y_1 = f(x_0, x_1, x_2, \ldots, x_{N-1})$$

$$y_2 = f(x_1, x_2, x_3, \ldots, x_N)$$

$$y_3 = f(x_2, x_3, x_4, \ldots, x_{N+1})$$

$$y_4 = f(x_2, x_3, x_4, \ldots, x_{N+1})$$

$$y_5 = f(x_3, x_4, x_5, \ldots, x_{N+2})$$

$$y_6 = f(x_4, x_5, x_6, \ldots, x_{N+3}) \quad \text{(Equation 1)}$$

As can be seen in the above equations, calculating $y_1$ requires the same data elements as those required for calculating $y_0$. Thus, the data elements are not shifted between calculating $y_1$ and $y_0$, only the filter coefficients may change. However, the data elements are shifted by one for calculating $y_2$ and again by one for calculating $y_3$. Calculating $y_4$ requires the same data elements as those required for calculating $y_3$, so again the data elements are not shifted, although again, different filter coefficients may be used. The data elements are then shifted by one for calculating $y_5$ and again by one for calculating $y_6$, and so forth. Thus, for the rate of 1.5× the shifting pattern repeats every three output samples.

In a downsampling filter, some of the data elements or data samples forming the filter inputs may be selectively eliminated for respective output samples. Eliminating data elements may be performed according to a pattern, dictated by the downsampling rate, whereby input data is shifted by one element between consecutive output samples, like in a normal integer filter, or shifted by multiple elements between consecutive output samples. Thus, the input data samples are shifted according to an irregular shifting pattern that repeats according to the downsampling rate. Additionally, a plurality of coefficient sets is used. For example, a rate of 0.75× means that for every 4 input samples the filter produces 3 output samples, and hence the input data shifts at a rate of 1/0.75=1.33 samples per output. This fractional rate is handled by using sets of coefficients to handle the fractional part and shifting the input data based on the integer part.

The following provides an example for a downsampling filter having a downsampling rate of 0.75×. Downsampling filtering may be performed according to for example the following equations:

$y_0 = f(x_0, x_1, x_2, \ldots, x_{N-1})$ $y_1 = f(x_1, x_2, x_3, \ldots, x_N)$ $y_2 = f(x_2, x_3, x_4, \ldots, x_{N+1})$ $y_3 = f(x_4, x_5, x_6, \ldots, x_{N+3})$ $y_4 = f(x_5, x_6, x_7, \ldots, x_{N+4})$ $y_5 = f(x_6, x_7, x_8, \ldots, x_{N+5})$ $y_6 = f(x_8, x_9, x_{10}, \ldots, x_{N+7})$ (Equation 2)

As can be seen in the above equations, the data elements are shifted by one for calculating $y_1$ and again by one for calculating $y_2$. However, calculating $y_3$ requires that the data elements would be shifted by two elements. The data elements are then shifted by one for calculating $y_4$, again by one for calculating $y_5$, by two elements for calculating $y_6$, and so forth. Thus, for the rate of 0.75× the pattern repeats every three output samples.

Embodiments of the present invention provide methods for shifting data elements of a string for performing an upsampling or a downsampling filter. Embodiments of the present invention may improve the operation of a processor or computer systems by, for example, simplifying the implementation of sample rate conversion, including upscaling and downsampling filtering, and by this reducing the overall time and hardware resources required for performing the sample rate conversion by the processor. For example, embodiments of the present invention may replace permutation of data elements for sample rate conversion, and by this perform the sample rate conversion for example using less and simpler hardware, eliminate pipeline stages, and simplify the software required for sample rate conversion. Embodiments of the present invention may be utilized for any application requiring sample rate conversion, for example, for audio processing, image processing etc.

Reference is made to FIG. 1A, which is a schematic illustration of an exemplary device according to embodiments of the invention. A device 100 may include a computer device, a video or image capture or playback device, a cellular device, a cellular telephone, a smartphone, a personal digital assistant (PDA), a video game console or any other digital device. Device 100 may include any device capable of executing a series of instructions, for example, for performing sample rate conversion, including upsampling or downsampling. Device 100 may include an input device 160 such as a mouse, a keyboard, a microphone, a camera, a Universal Serial Bus (USB) port, a compact-disk (CD) reader, any type of Bluetooth input device, etc., for providing input strings and other input, and an output device 170, for example, a transmitter or a monitor, projector, screen, printer, speakers, or display, for displaying multi-dimensional data such as video, image or audio data on a user interface according to a sequence of instructions executed by processor 110.

Device 100 may include a processor 110. Processor 110 may include or may be a vector processor, a central processing unit (CPU), a digital signal processor (DSP), a microprocessor, a controller, a chip, a microchip, a field-programmable gate array (FPGA), an application-specific integrated circuit (ASIC) or any other integrated circuit (IC), or any other suitable multi-purpose or specific processor or controller.

Device 100 may include an external memory unit 120 and an internal memory unit 130. Internal memory unit 130 may be a memory unit directly accessible to or internal to (physically attached or stored within) processor 110. Internal memory unit 130 may be a short-term memory unit, and external memory unit 120 may be a long-term and/or short-term memory unit. Internal memory unit 130 and external memory unit 120 may include, for example, random access memory (RAM), dynamic RAM (DRAM), flash memory, cache memory, volatile memory, non-volatile memory or other suitable memory units or storage units. Internal memory unit 130 and external memory unit 120 may be implemented as separate (for example, "off-chip") or integrated (for example, "on-chip") memory units. For example, internal memory unit 130 may be or may include a tightly-coupled memory (TCM), a buffer, or a cache, such as, an L-1 cache or an L-2 cache. Other or additional memory architectures may be used.

Processor 110 may include an execution unit 140. Processor 110 may request, retrieve, and process data from external memory unit 120 and/or internal memory unit 130, and may control, in general, the pipeline flow of operations or instructions executed on the data. Processor 110 may receive an instruction, for example, from a program memory (for example, in external memory unit 120 or internal memory 130) to perform sample rate conversion on a string of data elements. In one example, the instruction may perform sample rate conversion on a string of data by multiplying the data elements by coefficients of a filter and/or shift the data elements according to a shifting pattern. The shifting pattern may be given as a parameter of the instruction. According to embodiments of the present invention, processor 110 may receive an instruction to perform sample rate conversion from internal memory 130 as described herein. Data elements may be of any required data type, e.g., bit, byte, word, double-word, 32-bit elements, 64-bit elements, floating point, complex numbers, etc.

Processor 110 may include a plurality of individually addressable memory units, referred to as vector registers 150, for storing data elements and coefficients. As used herein, a vector may refer to a one-dimensional (1D) array of data elements. Vector registers 150 may be internal to processor 110 and either internal/integrated with internal memory unit 130 or external/separate from internal memory unit 130. Vector registers 150 may include for example input vector registers 152 for storing input data elements, coefficients vector registers 154 for storing coefficients, and accumulators or output registers 156 for storing the results, e.g., filter results. Processor 110 may load or transfer data elements to a memory relatively more internal or accessible to processor 110, for example, from external memory unit 120 to internal memory unit 130, or from internal memory unit 130 to vector registers 150. When using vector registers 150, processor 110 may load a string of data elements or a part or a portion of a string of data elements stored in memory units 120 or 130 into vector registers 150. Loading data elements from memory units 120 or 130 into vector registers 150 may be performed during or in a read cycle, also referred to as load cycle. A more internal or accessible memory unit may refer to a memory unit with shorter access times and faster load or read cycles.

Figure 1B:
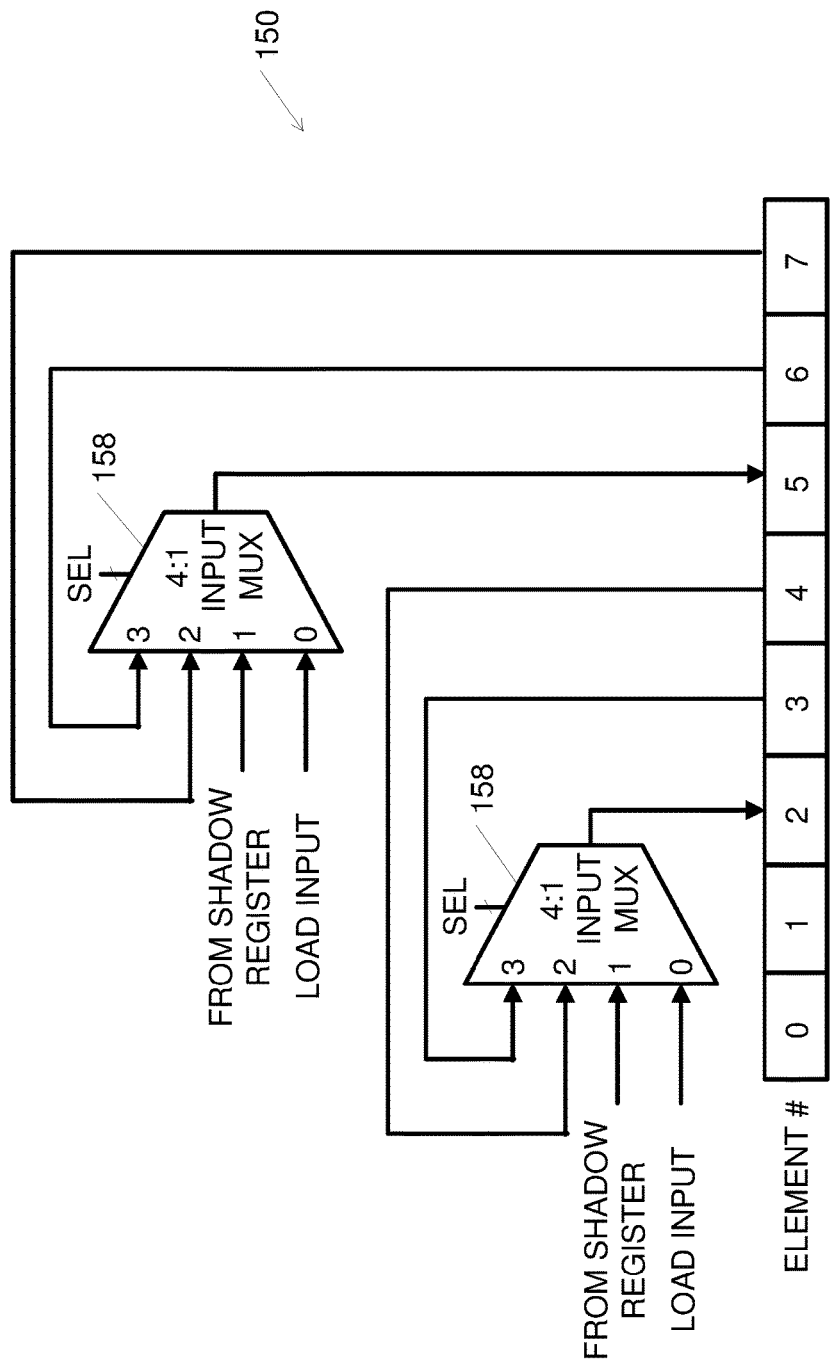
FIG. 1B is schematic illustration of an exemplary vector register according to embodiments of the invention.

FIG. 1B depicts a schematic illustration of an exemplary vector register according to embodiments of the invention. Each of vector registers 150 may include a plurality of memory elements (numbered 0-7, in this example), each configured to store a single data element. Thus, according to some embodiments, a vector register may be a register configured to store a plurality of data elements or a vector of data elements. The memory elements may be configured to store data elements of any required type, e.g., bytes, words, 32-bit words, 64-bit words, integers, complex numbers or any other size or type of data element, as required by the application. In addition, some or all of vector registers 150 may function as right or left shift registers, capable of shifting the data elements stored in these registers to the right or to the left, respectively. As used herein shifting to the left may refer to moving each data element by one memory element to a higher address in the vector register, where the data element stored in the highest address is shifted out. Shifting to the left may include shifting a data element from an adjacent vector register to the memory element with the lowest address. Shifting to the right may refer to moving each data element by one memory element to a lower address in the vector register, where the data element stored in the lowest address is shifted out. Shifting to the right may include shifting a data element from an adjacent vector register to the memory element with the highest address. Shifting to the right or shifting to the left may be referred to herein as a regular shifting pattern. Shifting data elements in vector register 150 differently than shifting to the right or shifting to the left (e.g., shifting some elements by one memory element and some by two memory elements or switching some data elements with a shadow register) may be referred to herein as irregular shifting. The scheme describing how data elements are shifted may be referred to herein as a shifting pattern or shifting scheme. A shifting pattern or shifting scheme that includes irregular shifting may be referred to herein as an irregular shifting pattern or irregular shifting scheme. Registers supporting irregular shifting patterns may be referred to herein as irregular shift registers.

According to embodiments of the present invention, some or all of vector registers 150 may function as irregular shift registers, capable of shifting the data elements stored in these registers according to an irregular shifting pattern as disclosed herein. For example, an element in an irregular shift register 150 according to embodiments of the present invention may include a selection mechanism, e.g., a four-to-one input multiplexer 158 (4:1 input mux) for selecting for example inputs such as:

Load input (for load operations and all other functionalities of other vector registers)
Next element input (shift by 1)
Second next element input (shift by 2)
Shadow register input (e.g., an element form a shadow register).

FIG. 1B depicts an exemplary four-to-one input multiplexers 158 for selecting an input for memory element #2 and #5 of vector register 150. However, similar four-to-one input multiplexers 158 may be connected to each memory element or to some memory elements of vector register 150, each with respective inputs. In addition, it should be readily understood by those skilled in the art that the next element input and the second next element input (the next element beyond the next element) may be taken from a shadow or adjacent register for data elements #6 and #7. The input may be selected according to an instruction, for example, using selection lines (labeled SEL in this example) as known in the art. In the non-limiting example of FIG. 1B, input #0 of multiplexer 158 is connected to the regular input, input #1 of multiplexer 158 is connected to the shadow register input, input #2 of multiplexer 158 is connected to the second next input (in this case to memory element #4), and input #3 of multiplexer 158 is connected to the next element input (in this case to memory element #3). According to embodiments of the present invention, other multiplexers, for example multiplexers with more or less inputs, or other selection mechanisms may be used.

According to some embodiments of the present invention, processor 110 may be configured to receive, for example, from a program memory (e.g., in external memory unit 120 or internal memory 130), an instruction to perform sample rate conversion on a string of input data. A subset of data elements of the string of input data may be stored in vector register 150. The instruction may include an irregular shifting pattern of the data elements in vector register 150. According to some embodiments of the present invention, the data elements in vector register 150 may be shifted according to the irregular shifting pattern.

According to embodiments of the present invention, execution unit 140 may perform a plurality of upsample or downsample filtering operations in parallel, e.g., a filter operation for a single output result may be performed serially, and a plurality of serial filters may be performed in parallel to each other. Thus, execution unit 140 may generate a plurality of output results in a plurality of computational cycles. In a typical computational cycle a stage of a plurality of upscale/downscale filters may be performed, e.g., for each output result, a data element may be multiplied by the appropriate filter coefficient. In each computational cycle, another data element may be multiplied by the appropriate filter coefficient. Data elements may be shifted according to an irregular shifting pattern between the computational cycles, as disclosed herein. The results of the plurality of computational cycles may be accumulated, e.g., added together (separately for each output result) to arrive at the final output results after the last computational cycle of the filter operation for that output result.

Figure 2:
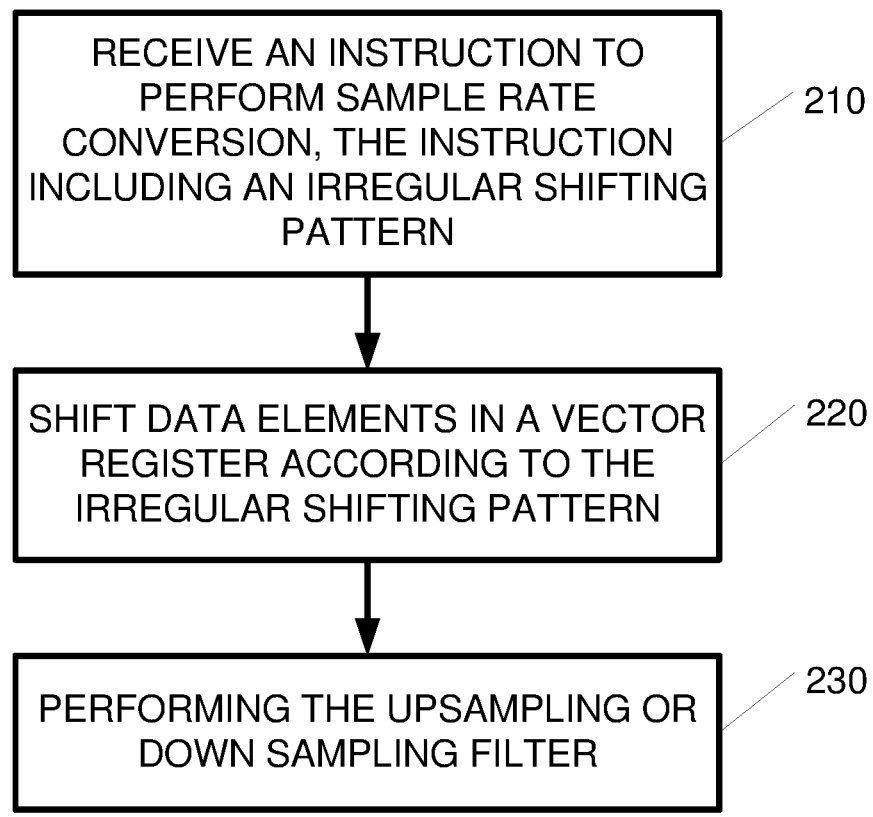
FIG. 2 is a flowchart diagram illustrating a method for sample rate conversion according to embodiments of the present invention.

Reference is now made to FIG. 2, which is a flowchart diagram illustrating a method for sample rate conversion, according to embodiments of the present invention. According to some embodiments, a method for sample rate conversion may be performed by any suitable processor, for example, processor 110 depicted in FIG. 1A, or other processors. In some embodiments a method for method for sample rate conversion may be initiated by a dedicated command or instruction.

In operation 210, an instruction or instructions to perform sample rate conversion may be received. According to embodiments of the present invention, the instruction may include an irregular shifting pattern of data elements stored in a vector register. The sample rate conversion may be for example upsampling or downsampling. In some embodiments there may be a dedicated instruction or instructions for upsampling and desiccated instruction or instructions for downsampling. In operation 220, the data elements in the vector register may be shifted according to the irregular shifting pattern as disclosed herein. In operation 230, upsampling or down sampling filtering may be performed. For example, a computational cycle of an upsampling or downsampling filter may be performed. A computational cycle of the filter may include multiplying each data element stored in the vector register by a corresponding filter coefficient, adding each result of the multiplication to a corresponding previous value stored in an output vector register, and storing the results of the addition in the output vector register. Filtering may be performed in parallel for a plurality of output samples by, in each computational cycle, e.g., in each clock cycle, multiplying the data elements in the vector register by an appropriate filter coefficient and accumulating the results according to for example:

$$acc\mathrel{<}=V10*coefficient+acc \qquad \text{(Equation 3)}$$

Where V10 is an input vector register (e.g. input vector register 152), coefficient is a coefficients vector register (e.g., coefficients vector register 154), and acc is an accumulator or output register (e.g., output register 156) for storing the filter results.

Figure 3:
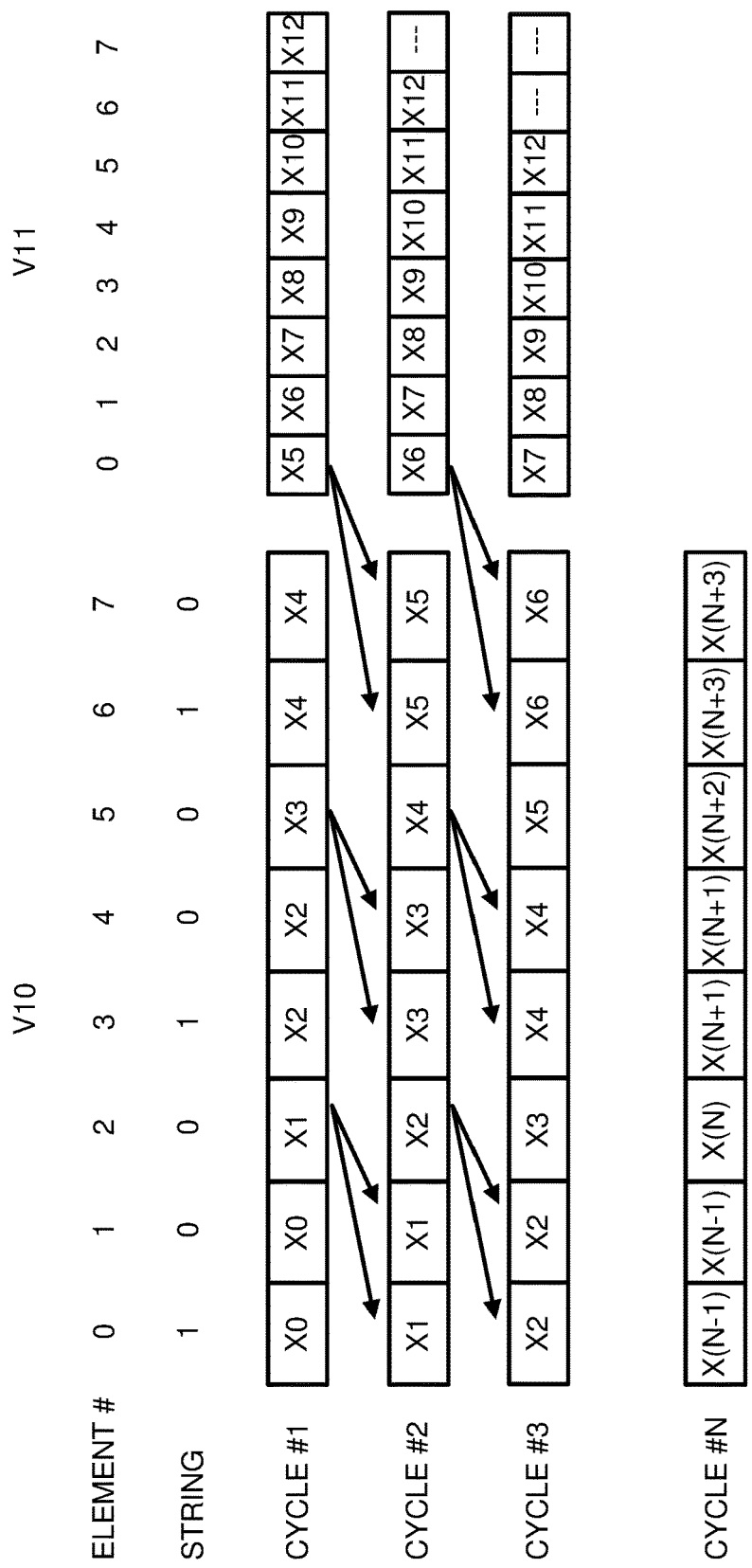
FIG. 3 depicts data elements stored in a vector register for performing an upsampling filter, in a plurality of computational cycles, according to embodiments of the present invention.

Reference is now made to FIG. 3 which depicts data elements stored in a vector register for performing an upsampling filter, in a plurality of computational cycles, according to embodiments of the present invention. Data elements X0 to X(N+3) represent data elements of an input string that is being upsampled, where N is the filter length. The vector register may be, for example, one of vector registers 150 depicted in FIGS. 1A and 1B. In the example presented in FIG. 3, filtering is performed using the data elements or data samples stored in input vector register V10, while vector register V11 is used as a shadow register for storing data elements to feed vector register V10. FIG. 3 depicts shifting pattern for an upsampling filter at a rate of 1.5×, as in the upsampling filter example presented hereinabove. In cycle #1, for example, after an initialization step, elements #0 and #1 of the vector register store data element x0, element #2 of the vector register stores data element x1, and so on. Upsample filtering operations may be performed in parallel, e.g., a filter operation for a single output result may be performed serially, and a plurality of serial filters may be performed in parallel to each other. The horizontal direction in FIG. 3 represents the vector elements for parallel operation, while the vertical direction represents sequential cycles of operation.

Input data elements X0 . . . X(N−1) are stored sequentially in the first vector element (element #0) and are used, e.g., multiplied by the appropriate filter coefficient, for the upsampling filtering operation. The results of the multiplication may be accumulated for generating a first output result. Similarly, input data elements X0 . . . X(N−1) (e.g., the same data elements stored in the first vector element) are stored sequentially in the second vector element (element #1) and are used for generating a second output result. Input data elements X1 . . . X(N) (e.g., the data elements stored in the second vector element, shifted by 1) are stored sequentially in the third vector element (element #2) and are used for generating a third output result. The fourth vector element (element #3), stores input data elements X2 . . . X(N+1) which are the data elements stored in the third vector element, shifted by 1, and the same pattern repeats.

According to embodiments of the present invention, a command or instruction for performing the upsampling filter may indicate the irregular shifting pattern, for example, by a flag, a switch or an operand. For example, the instruction may include an indication or flag stating whether a memory element should load a data element from an immediate (e.g., closest) next memory element or from a second next memory element.

For example, the irregular shifting pattern may be given by a string of elements, each corresponding to a data element in the input vector register. Each element in the string may have either a first value or a second value, where the first value may indicate that the corresponding memory element should load a data element from an immediate next memory element after the operation (shift by one) and the second value may indicate that the corresponding memory element should load a data element from the second next memory element after the operation (shift by two). In some embodiments, a logical "1" may indicate shift by two and a logical "0" may indicate shift by one. For example, a command for performing an upsampling filter may include the following string '10010010'. This command may indicate the following:

The first element in the string may relate to memory element #0 of V10. A value of '1' may indicate shift by two: load to memory element #0 of V10 the data element stored in the second next memory element, e.g., the data element stored in memory element #2 (in cycle #1 that would be X1). Thus, in cycle #2 X1, previously stored in memory element #2, is stored in memory element #0 of V10.

The second element in the string may relate to memory element #1 of V10. A value of '0' may indicate shift by one: load to memory element #1 of V10 the data element stored in the immediate next memory element, e.g., the data element stored in memory element #2 (in cycle #1 that would be X1). Thus, in cycle #2 X1, previously stored in memory element #2, is stored in memory element #1 of V10.

The third element in the string may relate to memory element #2 of V10. A value of '0' may indicate shift by one: load to memory element #2 of V10 the data element stored in the immediate next memory element, e.g., the data element stored in memory element #3 (in cycle #1 that would be X2). Thus, in cycle #2 X2, previously stored in memory element #3, is stored in memory element #2 of V10.

The same pattern repeats for the remaining elements in the string. Data elements for memory elements #6 and #7 of input vector register V10 may be loaded from shadow register V11, according to the corresponding value in the string, where memory element #0 of shadow register V11 is considered as the immediate next memory element to memory element #7 of input vector register V10. For example, the corresponding value in the string for memory element #6 is '1', indicating shift by two. Therefore, in the following cycle, the data element stored in memory element #0 of shadow register V11 would be loaded into memory element #6.

For example, the following set of commands may perform upsampling filtering for providing y0-y6 of equation 1. The VMACRX instruction performs the filtering (according to equation 3) and the shifting according to the string in the curly bracket (the text square bracket is not a part of the command and only provides the multiplications being performed as a result of the command, according to the example presented in FIG. 3). The VMACRX instruction may be included in an assembly language of a vector processor (e.g., processor 110). The coefficients (marked 'c') are loaded using other instructions that are performed in parallel and are not listed here for simplicity.

VMACRX {8'b10010010} [x0*c00, x0*c10, x1*c20, x2*c30, x2*c40, x3*c50, x4*c60, x4*c70]
VMACRX {8'b10010010} [x1*c01, x1*c11, x2*c21, x3*c31, x3*c41, x4*c51, x5*c61, x5*c71]
VMACRX {8'b10010010} [x2*c02, x2*c12, x3*c22, x4*c32, x4*c42, x5*c52, x6*c62, x6*c72]
. . .
VMACRX {8'b10010010} [x(N−1)*c0(N−1), x(N−1)*c1(N−1) . . . x(N+3)*c7(N−1)]

Figure 4:
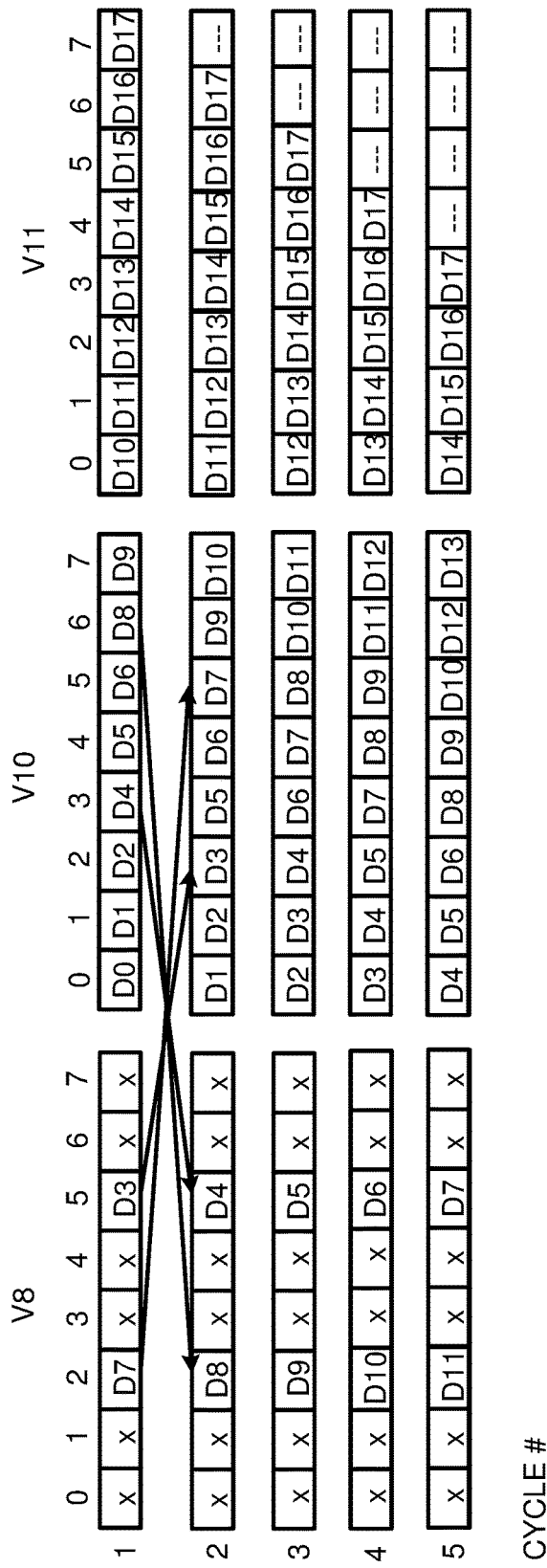
FIG. 4 depicts data elements stored in three vector registers in a plurality of computational cycles, for performing a downsampling filter, according to embodiments of the present invention.

Reference is now made to FIG. 4 which depicts data elements stored in three vector registers, named V8, V10 and V11, in a plurality of computational cycles, for performing a downsampling filter, according to embodiments of the present invention. D0-D17 represent data elements or data samples of an input string that is being downsampled. The vector registers may be, for example, a subgroup of vector registers 150 depicted in FIGS. 1A and 1B. FIG. 4 depicts shifting pattern for a 5-tap downsampling filter at a rate of 0.75×, as in the downsampling filter example presented hereinabove. In cycle #1, for example, after an initialization step, element #0 of vector register V10 store data element D0, element #1 of vector register V10 store data element D1, and so on as depicted in FIG. 4. In the example presented in FIG. 4, filtering is performed using the data elements or data samples stored in input vector register V10, while vector register V11 is used as a shadow register for storing data elements to feed vector register V10 and vector register V8 is used as a shadow register for storing data elements that are not used in a current computational cycle but may be required for subsequent computational cycles, as disclosed herein. As mentioned before, downsample filtering operations may be performed in parallel, e.g., a filter operation for a single output result may be performed serially, and a plurality of serial filters may be performed in parallel to each other. The horizontal direction in FIG. 4 represents the vector memory elements used for the parallel operation, e.g., according to equation 3, while the vertical direction represents sequential cycles of operation.

Input data elements D0 . . . D4 are stored sequentially in the first vector element (element #0) and are used, e.g., multiplied by the appropriate filter coefficient, for the downsample filtering operation. The results of the multiplication may be accumulated for generating a first output result Similarly, input data elements D1 . . . D5 (e.g., the data elements stored in the first vector element, shifted by 1) are stored sequentially in the second vector element (element #1) and are used for generating a second output result. Input data elements D2 . . . D6 (e.g., the data elements stored in the second vector element, shifted by 1) are stored sequentially in the third vector element (element #2) and are used for generating a third output result. The fourth vector element (element #3), however, stores input data elements D4 . . . D8 which are the data elements stored in the third vector element, shifted by 2, and the same pattern repeats.

Thus, in the example, of FIG. 4, input data elements D3 and D7 are not used in the first computational cycle. Therefore, D3 and D7 are not stored in input vector register V10. However, input data elements D3 and D7 are required for the next computational cycles. For example, in computational cycle #2 input data element D3 should be stored in vector element #2 and input data element D7 should be stored in vector element #5 of input vector register V10 Similarly, input data elements D4 and D8, are used in the first computational cycle, but are not used in the second computational cycle. Input data elements D4 and D8, are required again for the next computational cycles. For example, in computational cycle #3 input data element D4 should be stored in vector element #2 and input data element D8 should be stored in vector element #5 of vector register V10. This irregular pattern repeats itself. In a specific computational cycle, data elements that were stored in a previous computational cycle in vector element #3 and in vector element #6 are not required, and the same data elements that were not required in the previous computational cycle (e.g., data elements that were stored in vector element #3 and in vector element #6 one computational cycle before the previous computational cycle) should now be stored in vector element #2 and vector element #5. Thus, data elements should be shifted according to this irregular shifting pattern between the computational cycles.

According to embodiments of the present invention, the irregular shifting pattern may be performed by using another shadow vector register, e.g., vector register V8. For example, when shifting data within vector register V10 data elements that are not required for the next computational cycle are skipped. These data elements, however, may be stored in shadow vector register V8 so that they can be restored in the succeeding cycle. Thus, some of the data elements in vector register V10 are shifted by one memory element, and some are swapped with a data element previously stored in shadow vector register V8 (e.g., some data elements are loaded to shadow vector register V8 from input vector register V10, and some data elements that were previously stored in shadow vector register V8 are loaded into input vector register V10 from shadow vector register V8), according to the irregular shifting pattern. For example, between computational cycle #1 and computational cycle #2 data elements D0, D1, D2, D5, D6 and D9 are shifted by one, where D0 is shifted out of vector register V10, and D10 is shifted into V10 from shadow vector register V11. Data elements D4 and D8, however, are swapped with data elements D3 and D7, which were previously stored in shadow vector register V8.

According to embodiments of the present invention, the irregular shifting pattern may be provided by an indication stating whether a memory element in input vector register V10 should load a data element from an immediate next memory element, or whether the memory element should load a data element previously stored in a shadow vector register V8 and the data element stored in the immediate next memory element should be loaded into the shadow vector register V8.

According to embodiments of the present invention, a command or instruction for performing the downsampling filter may indicate the irregular shifting pattern, for example, by a flag, a switch or an operand. For example, the instruction may include a string of elements, each having one of a first value and a second value, and each corresponding to a data element of input vector register V10, wherein the first value indicates that a corresponding memory element should load a data element from an immediate next memory element and the second value indicates swapping of data elements e.g., that a corresponding memory element should load a data element previously stored in a shadow vector register V8 and the data element stored in the immediate next memory element is loaded into the shadow vector register V8.

In some embodiments, a logical "1" may indicate swapping of data elements and a logical "0" may indicate shift by one. For example, a command for performing an upsampling filter may include the following string '00100100'. This command may indicate the following:

The first element in the string may relate to memory element #0 of V10. A value of '0' may indicate shift by one: load to memory element #0 of V10 the data element stored in the immediate memory element, e.g., the data element stored in memory element #1 of V10 (in cycle #1 that would be D1). Thus, in cycle #2 D1, previously stored in memory element #1, is stored in memory element #0 of V10.

The second element in the string may relate to memory element #1 of V10. A value of '0' may indicate shift by one: load to memory element #1 of V10 the data element stored in the immediate next memory element, e.g., the data element stored in memory element #2 (in cycle #1 that would be D2). Thus, in cycle #2 D2, previously stored in memory element #2, is stored in memory element #1 of V10.

The third element in the string may relate to memory element #2 of V10. A value of '1' may indicate swapping of data elements: load to memory element #2 of V10 a data element previously stored in shadow vector register V8 (in cycle #1 that would be D3), and load the data element stored in the immediate next memory element, e.g., the data element stored in memory element #3 (in cycle #1 that would be D4) into the shadow register V8. Thus, in cycle #2 D3, previously stored in shadow register V8 is stored in memory element #2 of V10, and D4 previously stored in memory element #3, of V10 is stored in shadow register V8.

The same pattern repeats for the remaining elements in the string. Data elements for memory element #7 of input vector register V10 may be loaded from shadow register V11, according to the corresponding value in the string, where memory element #0 of shadow register V11 is considered as the immediate next memory element to memory element #7 of input vector register V10.

It should be readily understood that the examples presented herein are not limiting and embodiments of the invention may be used with other rates of upsampling and down sampling. Additionally, the instructions presented herein are non-limiting examples of possible implementations of embodiments of the present invention. Embodiments of the present invention are not limited to these instructions and may be implemented using other instructions, with other formats, parameters and switches.

While being especially beneficial for image processing and communication systems, embodiments of the invention can be efficiently used in any application that requires symmetrical filtering; other uses or functionality may also be made in other embodiments.

Embodiments of the invention may be implemented for example on an integrated circuit (IC), for example, by constructing execution unit 140, as well as other components of FIGS. 1A and 1B in an integrated chip or as a part of an chip, such as an ASIC, an FPGA, a CPU, a DSP, a microprocessor, a controller, a chip, a microchip, etc.

According to embodiments of the present invention, some units e.g., execution unit 140, as well as the other components of FIGS. 1A and 1B, may be implemented in a hardware description language (HDL) design, written in Very High Speed Integrated Circuit (VHSIC) hardware description language (VHDL), Verilog HDL, or any other hardware description language. The HDL design may be synthesized using any synthesis engine such as SYNOPSYS® Design Compiler 2000.05 (DC00), BUILDGATES® synthesis tool available from, inter alia, Cadence Design Systems, Inc. An ASIC or other integrated circuit may be fabricated using the HDL design. The HDL design may be synthesized into a logic level representation, and then reduced to a physical device using compilation, layout and fabrication techniques, as known in the art.

Embodiments of the present invention may include a computer program application stored in non-volatile memory, non-transitory storage medium, or computer-readable storage medium (e.g., hard drive, flash memory, CD ROM, magnetic media, etc.), storing instructions that when executed by a processor (e.g., processor 110) carry out embodiments of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method for performing sample rate conversion by an execution unit, the method comprising:
receiving an instruction, wherein the instruction comprises an irregular shifting pattern of data elements stored in a vector register; and
shifting the data elements in the vector register according to the irregular shifting pattern,
wherein the sample rate conversion comprises downsampling, and wherein the irregular shifting pattern is provided by an indication stating whether a memory element in the input vector register loads a data element from an immediate next memory element, or whether the memory element loads a data element previously stored in a shadow vector register and the data element stored in the immediate next memory element is loaded into the shadow vector register.

2. The method of claim 1, further comprising:
multiplying each data element stored in the vector register by a corresponding filter coefficient;
adding each result of the multiplication to a corresponding previous value stored in an output register; and
storing the results of the addition in the output register.

3. The method of claim 1, wherein the instruction comprises a string of elements, each having one of a first value and a second value, and each corresponding to a memory element of the input register, wherein the first value indicates that the corresponding memory element in the input vector register loads the data element from the immediate next memory element and the second value indicates that the corresponding memory element loads the data element previously stored in the shadow vector register and the data element stored in the immediate next memory element is loaded into the shadow vector register.

4. A processor for performing sample rate conversion, the processor comprising:
a vector register comprising a plurality of memory elements for storing data elements;
a shadow register; and
an execution unit configured to:
receive an instruction, wherein the instruction comprises an irregular shifting pattern for the data elements stored in the vector register; and
shift the data elements in the vector register according to the irregular shifting pattern,
wherein the sample rate conversion comprises downsampling, and wherein the irregular shifting pattern is provided by an indication stating whether a memory element in the input vector register loads a data element from an immediate next memory element, or whether the memory element loads a data element previously stored in the shadow vector register and the data element stored in the immediate next memory element is loaded into the shadow vector register.

5. The processor of claim 4, further comprising an output register, wherein the execution unit is further configured to:
multiply each data element stored in the vector register by a corresponding filter coefficient;
add each result of the multiplication to a corresponding previous value stored in the output register; and
store the results of the addition in the output register.

6. The processor of claim 4, wherein the instruction comprises a string of elements, each having one of a first value and a second value, and each corresponding to a memory element of the input register, wherein the first value indicates that the corresponding memory element in the input vector register loads the data element from the immediate next memory element and the second value indicates that the corresponding memory element loads the data element previously stored in the shadow vector register and the data element stored in the immediate next memory element is loaded into the shadow vector register.

7. The processor of claim 4, further comprising:
a plurality of selection mechanisms, each connected to one of the memory elements and configured to select one of the following inputs: load input, next element input, second next element input, and shadow register input.

8. A method for performing sample rate conversion by a processor, the processor comprising a register for storing data elements, the method comprising:
receiving an indication of an irregular shifting pattern of the data elements stored in the register; and
shifting the data elements in the register according to the irregular shifting pattern,
wherein the sample rate conversion comprises downsampling, and wherein the indication suggests whether a memory element in the input vector register should load a data element from an immediate next memory element, or whether the memory element should load a data element previously stored in a shadow vector register and the data element stored in the immediate next memory element is loaded into the shadow vector register.

9. The method of claim 8, further comprising:
multiplying each data element stored in the vector register by a corresponding filter coefficient;
adding each result of the multiplication to a corresponding previous value stored in an output register; and
storing the results of the addition in the output register.

10. The method of claim 8, wherein the irregular shifting pattern comprises a string of elements, each having one of a first value and a second value, and each corresponding to a memory element of the input register, wherein the first value indicates that the corresponding memory element in the input vector register loads the data element from the immediate next memory element and the second value indicates that the corresponding memory element loads the data element previously stored in the shadow vector register and the data element stored in the immediate next memory element is loaded into the shadow vector register.

* * * * *